Feb. 2, 1932.     R. B. MUNDAY     1,843,487
FITTING
Filed Feb. 3, 1930
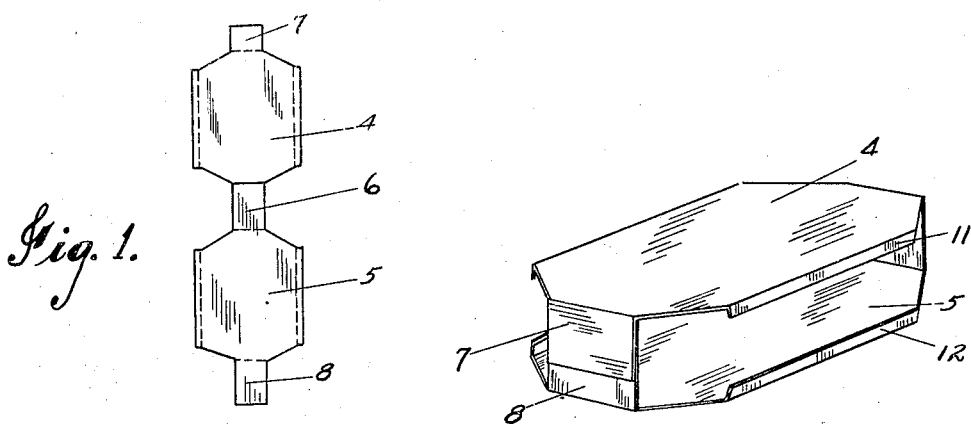
Fig. 1.
Fig. 2.
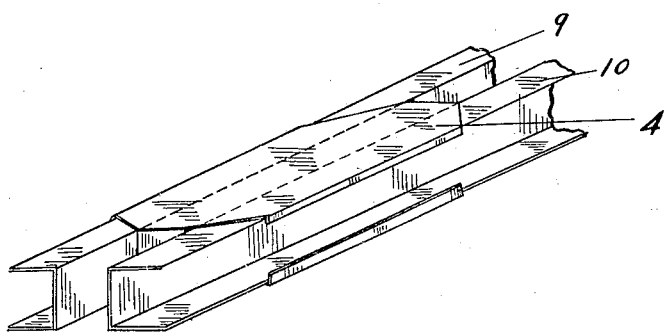
Fig. 3.
INVENTOR.
Richard B. Munday
BY
Bennett R. Knight
ATTORNEY.

Patented Feb. 2, 1932

1,843,487

UNITED STATES PATENT OFFICE

RICHARD B. MUNDAY, OF DAYTON, OHIO, ASSIGNOR TO RINEHART-WHELAN COMPANY, OF DAYTON, OHIO, A CORPORATION OF OHIO

FITTING

Application filed February 3, 1930. Serial No. 425,497.

My invention relates to a fitting and more particularly to a truss fitting especially well adapted for use in airplane structures.

The principal object of my invention is to provide a fitting that will act as a jig and accurately and uniformly align the longitudinal members in all directions and hold them in place. This construction obviates the necessity of using a separate jig to align the channel members.

Another object of my invention is to provide a fitting which is adapted to hold channel members in an accurately fixed relation without the use of rivets or welding or any other separate means for fixation.

If, as is desirable, rivets or some other means of securing are used and become loose, the members are still held in their proper relation. The fitting also on account of being held rigidly to the longitudinal members, relieves strain on the rivets or other means of fastening to the longitudinal members and therefore lessens the strain on the rivets or other means of fastening, thereby eliminating the danger of other means becoming loose. The fitting also greatly increases strength of rigidity because of its one piece design.

Another object of my invention is to provide a fitting which is simple and inexpensive and consequently can be assembled with facility by unskilled labor.

Another object of my invention is to provide truss plates for opposite sides of longitudinal members made of one piece.

Another object of my invention is to eliminate the handling of extra and unnecessary parts. With my invention one fitting only is handled while with previous devices, the channel members were fitted in a jig form and assembled.

In the particular embodiment of my invention selected for illustration:

Figure 1 is a plan view of the fitting before forming,

Fig. 2, is a perspective of the fitting ready for use, and

Fig. 3, another perspective, shows the channel members inserted and held in place in the fitting.

Referring now to the drawings, the fitting is composed of truss plates 4 and 5, secured together by an integral web 6. The free ends 7 and 8 are bent over and secured together in any suitable manner. The channel members 9 and 10 are inserted thru the guide ways formed between the plates 4 and 5, and the edges of the ends 7 and 8 and web 6 and are firmly held in this position by the bent over edges 11 and 12 of the plates 4 and 5 respectively.

Although it is not essential, the channel members 9 and 10 may be secured in position in the guide ways of the fitting by means of rivets, bolts, welding or by locking the edges 11 and 12 over the channel members. If it is desired the edges 11 and 12 of the plates 4 and 5 need not be turned over but the channel members may be secured to the plates 4 and 5 in any suitable manner.

I claim as my invention and desire to secure by Letters Patent of the United States:

1. A fitting having a pair of plates spaced from each other and secured together at their ends, and guide ways between said plates in which channel members are inserted and held in definite relation to each other.

2. A truss fitting having a pair of truss plates adapted to be foldably secured in spaced relation to each other and to form between them when folded guide ways in which longitudinal members are held in definite relation to each other.

3. A fitting having truss plates for opposite sides of the truss constructed in one piece and forming between them guide ways in which longitudinal members are held in definite relation to each other 4. A fitting having a pair of truss plates, spaced from each other and lying substantially in parallel planes, said plates being constructed to form guide ways between them and corresponding turned over edges on said plates forming retaining means for channel members inserted in said guide ways.

5. A fitting having a pair of truss plates, spaced from each other and secured together at their ends, guides ways between said plates in which channel members are inserted and held in definite relation to each other and means formed on said plates preventing lateral displacement of said channel members when inserted in said guide ways.

6. A fitting having a pair of truss plates, spaced from each other and secured together at their ends, means formed on said plates permitting self alinement of channel members inserted between said plates, and means for maintaining said channel members in alined position.

7. A fitting having a pair of truss plates, spaced from each other and lying in substantially parallel planes, said plates being secured together at their ends, a pair of guide ways formed between said plates in which channel members are inserted and means formed on said plates preventing lateral displacement of the channel members when inserted in said guide ways.

In testimony whereof I have hereunto set my hand.

RICHARD B. MUNDAY.